United States Patent
Yamamura (10) Patent No.: US 10,031,852 B2
(45) Date of Patent: Jul. 24, 2018

(54) ARITHMETIC PROCESSING APPARATUS AND CONTROL METHOD OF THE ARITHMETIC PROCESSING APPARATUS

(71) Applicant: FUJITSU LIMITED, Kawasaki-shi, Kanagawa (JP)

(72) Inventor: Shuji Yamamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/465,674

(22) Filed: Mar. 22, 2017

(65) Prior Publication Data

US 2017/0300416 A1    Oct. 19, 2017

(30) Foreign Application Priority Data

Apr. 14, 2016  (JP) ................. 2016-081294

(51) Int. Cl.
| | |
|---|---|
| *G06F 12/08* | (2016.01) |
| *G06F 12/0862* | (2016.01) |
| *G06F 9/30* | (2018.01) |
| *G06F 9/38* | (2018.01) |
| *G06F 12/0811* | (2016.01) |

(52) U.S. Cl.
CPC ...... *G06F 12/0862* (2013.01); *G06F 9/30043* (2013.01); *G06F 9/3802* (2013.01); *G06F 12/0811* (2013.01); *G06F 2212/1021* (2013.01); *G06F 2212/602* (2013.01); *G06F 2212/62* (2013.01)

(58) Field of Classification Search
None
See application file for complete search history.

(56) References Cited

U.S. PATENT DOCUMENTS

| | | | | |
|---|---|---|---|---|
| 7,130,890 B1 * | 10/2006 | Kumar | ................. | H04L 67/2847 709/218 |
| 9,786,342 B2 * | 10/2017 | Noguchi | ............. | G11C 11/1659 |
| 2009/0063777 A1 | 3/2009 | Usui | | |
| 2014/0164712 A1 | 6/2014 | Takamura | | |
| 2016/0041914 A1 * | 2/2016 | Eckert | ................. | G06F 12/0862 711/137 |
| 2016/0189761 A1 * | 6/2016 | Noguchi | ............. | G06F 12/0862 365/158 |
| 2017/0357587 A1 * | 12/2017 | Jones, III | ............ | G06F 12/0862 |

FOREIGN PATENT DOCUMENTS

| | | |
|---|---|---|
| JP | 04-344935 | 12/1992 |
| JP | 2009-059077 | 3/2009 |
| JP | 2014-115851 | 6/2014 |

* cited by examiner

*Primary Examiner* — Kevin Verbrugge
(74) *Attorney, Agent, or Firm* — Fujitsu Patent Center (57) ABSTRACT

An arithmetic processing apparatus includes a prefetch unit configured to send a prefetch request to a subordinate cache memory for prefetching data of a main storage device into a primary cache memory. The arithmetic processing apparatus further includes a count unit configured to count a hit count of how many times it is detected that prefetch request target data is retained in the subordinate cache memory when executing a response process to respond to the prefetch request sent from the prefetch unit. The arithmetic processing apparatus yet further includes an inhibition unit configured to inhibit the prefetch unit from sending the prefetch request when the counted hit count reaches a threshold value.

6 Claims, 10 Drawing Sheets

ARITHMETIC PROCESSING APPARATUS AND CONTROL METHOD OF THE ARITHMETIC PROCESSING APPARATUS

CROSS-REFERENCE TO RELATED APPLICATIONS

This application is based upon and claims the benefit of priority of the prior Japanese Patent Application No. JP2016-81294, filed on Apr. 14, 2016, the entire contents of which are incorporated herein by reference.

FIELD

The present invention pertains to an arithmetic processing apparatus and a control method of the arithmetic processing apparatus.

BACKGROUND

An algorithm for improving accuracy of a prefetch has hitherto been studied and researched. Especially, a circuit to request an automatically generated prefetch address to be prefetched is called a hardware prefetch circuit. The hardware prefetch circuit detects that a memory access address issued by a processor has regularity when executing an instruction, and generates a prefetch request for data predicted to be accessed in a near future. Exemplified as a hitherto used technique is a technique by which the hardware prefetch circuit generates the prefetch request by detecting an access to a consecutive address and the address at a fixed interval called "stride", and presuming an address to be accessed next. This exemplified conventional technique is called a "stride prefetch". However, after finding a tendency (an address pattern) of the address to be accessed next, it follows that the conventional prefetch technique continuously generates the prefetch. As a result, it may happen that prefetch request target data is continuously hit in a cache.

DOCUMENTS OF PRIOR ARTS

Patent Documents

[Patent Document 1] Japanese Patent Application Laid-Open Publication No. 2014-115851
[Patent Document 2] Japanese Patent Application Laid-Open Publication No. 2009-59077
[Patent Document 3] Japanese Patent Application Laid-Open Publication No. H04-344935

SUMMARY

An aspect of an embodiment is illustrated by an arithmetic processing apparatus. The arithmetic processing apparatus includes a prefetch unit configured to send a prefetch request to a subordinate cache memory for prefetching data of a main storage device into a primary cache memory. The arithmetic processing apparatus further includes a count unit configured to count a hit count of how many times it is detected that prefetch request target data is retained in the subordinate cache memory when executing a response process to respond to the prefetch request sent from the prefetch unit. The arithmetic processing apparatus yet further includes an inhibition unit configured to inhibit the prefetch unit from sending the prefetch request when the counted hit count reaches a threshold value.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

A prefetch in a processor is a technique schemed to improve performance by concealing memory access latency in a way that previously fetches data predicted to be access. It may, however, happen that the hardware prefetch circuit iteratively generates the address to be hit in the cache as the prefetch request target. The address to be hit in the cache is said to be an address that may not be originally prefetched. Accordingly, the prefetch request for the address to be hit in the cache contains a futile process and is said to be a prefetch request that is less of an effect in improving efficiency.

Even the prefetch request that is less of the effect in improving the efficiency is put into a control pipeline with the cache memory. Consequently, the prefetch request that is less of the effect in improving the efficiency consumes futile electric power in order to operate the control pipeline, and works to disable other useful requests from being put into the control pipeline. Accordingly, the prefetch request that is less of the effect in improving the efficiency has a possibility of becoming a factor for a decrease in performance of the processor.

Under such circumstances, embodiments of the disclosure aim at improving processing efficiency of a processor in a cache memory by inhibiting a prefetch request that is less of the effect in improving the efficiency.

Thus, information processing apparatuses 100, 101 according to one embodiment will hereinafter be described with reference to drawings. A configuration of the following embodiment is an exemplification, and the information processing apparatuses 100, 101 are not limited to the configuration of the embodiment. The embodiment is configured to reduce futile prefetch requests having a small effect in improving performance in a processor enabled to prefetch data to a cache memory. An operation having the small effect in improving the performance in the cache memory can be thereby restrained, and such effects are therefore obtained as to reduce electric power and improve the performance.

A prefetch based on a hardware circuit involves generating a prefetch address by automatically recognizing a feature and a tendency of an address of a memory access request. By the way, when the prefetch address continues being hit in a cache memory once, the prefetch address tends to be cache-hit also at a prefetch conducted afterward. This is because a process of the information processing apparatus repeats an access pattern performed before in many cases. In other words, it follows that a predicted prefetch address and an address of data to be cached repeat the same access pattern. It may therefore happen that a phenomenon of prefetch request target data being already cached in the cache memory is repeated. The information processing apparatuses 100, 101 according to the embodiment will hereinafter inhibit the prefetch request having the small effect in improving the performance by utilizing the tendency and the phenomenon described above.

Embodiment 1

Figure 1:
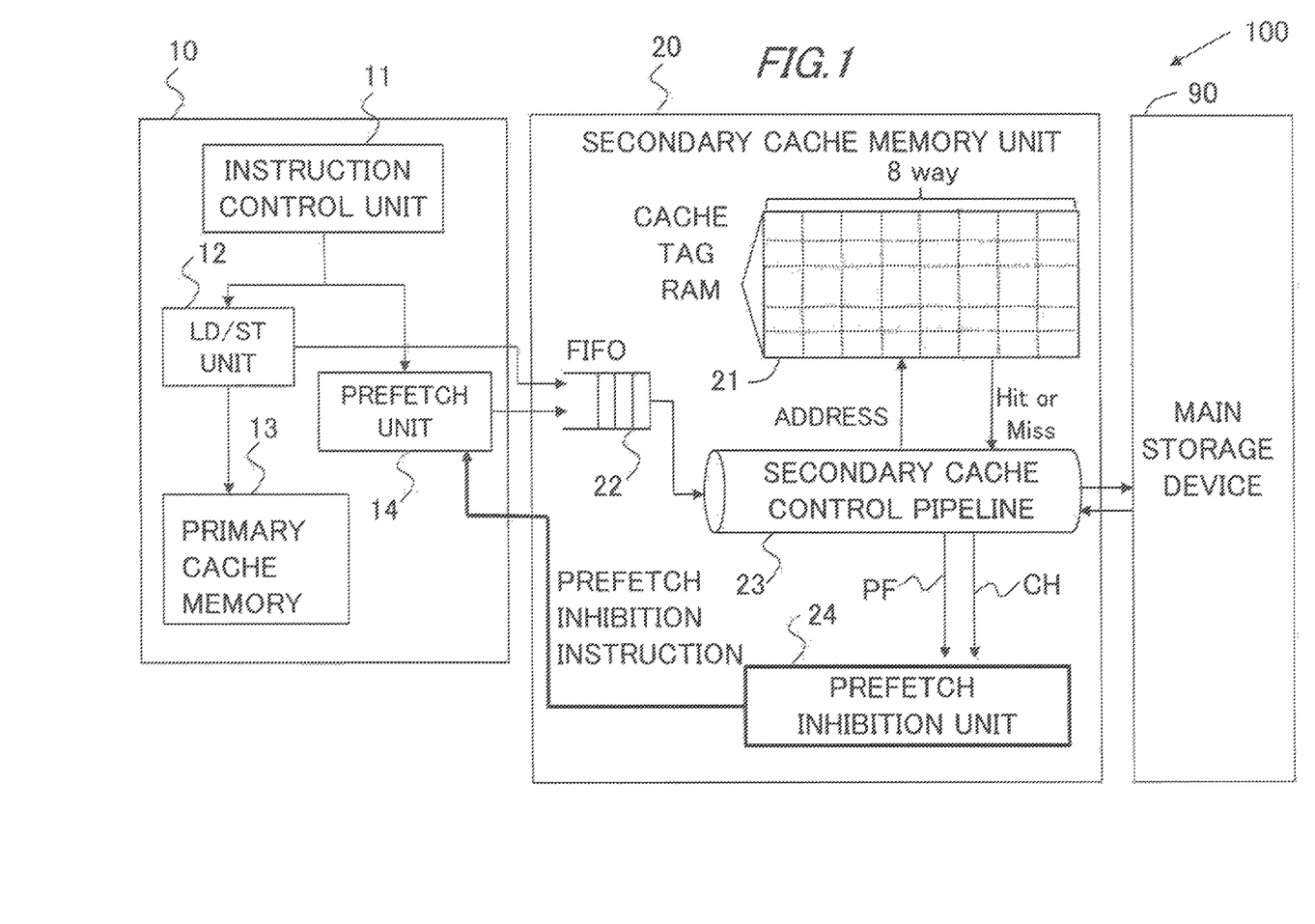
FIG. 1 is a diagram illustrating a configuration of an information processing apparatus according to an embodiment 1.

The information processing apparatus 100 according to an embodiment 1 will hereinafter be described with reference to FIGS. 1 through 9. FIG. 1 illustrates a configuration of the information processing apparatus 100. The information processing apparatus 100 includes a processor 10, a secondary cache memory unit 20, and a main storage device 90. In FIG. 1, the secondary cache memory unit 20 is connected to an external processor 10. It does not, however, mean that the information processing apparatus 100 is limited to the configuration in FIG. 1. For example, another available configuration is that the processor 10 has built-in components of the secondary cache memory unit 20. The processor 10 can be said to be one example of an "arithmetic processing apparatus". However, the processor 10 and the secondary cache memory unit 20 defined as a subordinate cache memory can be also said to be one example of the "arithmetic processing apparatus". An example given below will exemplify a configuration and operation of the arithmetic processing apparatus, and a method of controlling the arithmetic processing apparatus.

In an example of FIG. 1, the processor 10 includes an instruction control unit 11, a load/store (LD/ST) unit 12, a primary cache memory 13, and a prefetch unit 14. The instruction control unit 11 controls processes instanced by an instruction fetch, decode, an operand fetch (data load), execution of an instruction and storing of an execution result.

The LD/ST unit 12 executes the load process and the store process. The load process is a process of reading data to a register from the main storage device 90 via the primary cache memory 13, the secondary cache memory unit 20 and other equivalent memories. The store process is to store the data in the main storage device 90 from the register via the primary cache memory 13 and the secondary cache memory unit 20. However, a miss-hit occurs in the primary cache memory 13, in which case the LD/ST unit 12 issues a data readout request to an input port of a First IN First OUT (FIFO) 22 of the secondary cache memory unit 20, and causes the primary cache memory 13 to retain the data.

The prefetch unit 14 issues the prefetch request to the secondary cache memory unit 20. The prefetch request is said to be a request for instructing the explicitly subordinate storage device, e.g., the secondary cache memory unit 20 or the main storage device 90 to fetch the data stored in the main storage device 90 into the primary cache memory 13. The prefetch unit 14 is combined with the LD/ST unit 12, and monitors an address of a memory access request (the load instruction, the store instruction, and other equivalent instructions) issued to the LD/ST unit 12 from the instruction control unit 11. The prefetch unit 14, when detecting that the memory access target address has predetermined regularity, generates an address to which a prospective access is predicted to occur. The prefetch unit 14 issues the memory access request containing the generated address to the secondary cache memory unit 20. The secondary cache memory unit 20 includes the FIFO 22 to accept the memory access requests from the LD/ST unit 12 and the prefetch unit 14, a secondary cache control pipeline 23, a cache tag Random Access Memory (RAM) 21, and a prefetch inhibition unit 24. Note that a cache data RAM to retain the data of the main storage device 90 is, though omitted in the secondary cache memory unit 20 in FIG. 1, provided corresponding to the cache tag RAM 21. The prefetch unit 14 is one example of a "prefetch unit". The secondary cache memory unit 20 is one example of a "subordinate cache memory" to transfer and receive the data between the primary cache memory 13 and the main storage device 90.

Figure 2:
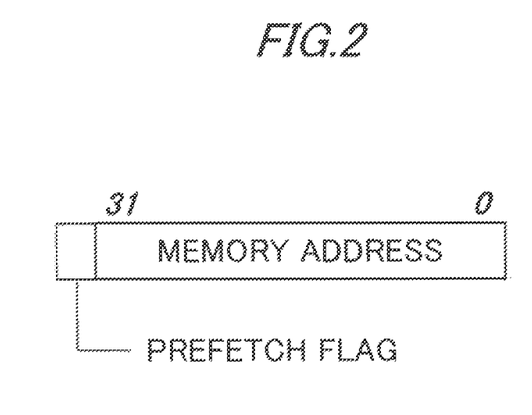
FIG. 2 is a diagram illustrating a format of a memory access request.

FIG. 2 illustrates a format of the memory access request issued by the prefetch unit 14. The memory access request issued by the prefetch unit 14 has a 32-bit address and a 1-bit prefetch flag. The 32-bit address is an access destination address in the main storage device 90. The prefetch flag indicates whether the memory access request is the prefetch request. When the memory access request is a request issued from the prefetch unit 14, the prefetch flag is set ON in the memory access request.

The FIFO 22 accepts and stores the request from the processor 10 via the input port. The secondary cache control pipeline 23 sequentially acquires the memory access requests from the FIFO 22, and executes the process corresponding to the memory access request.

Figure 3:
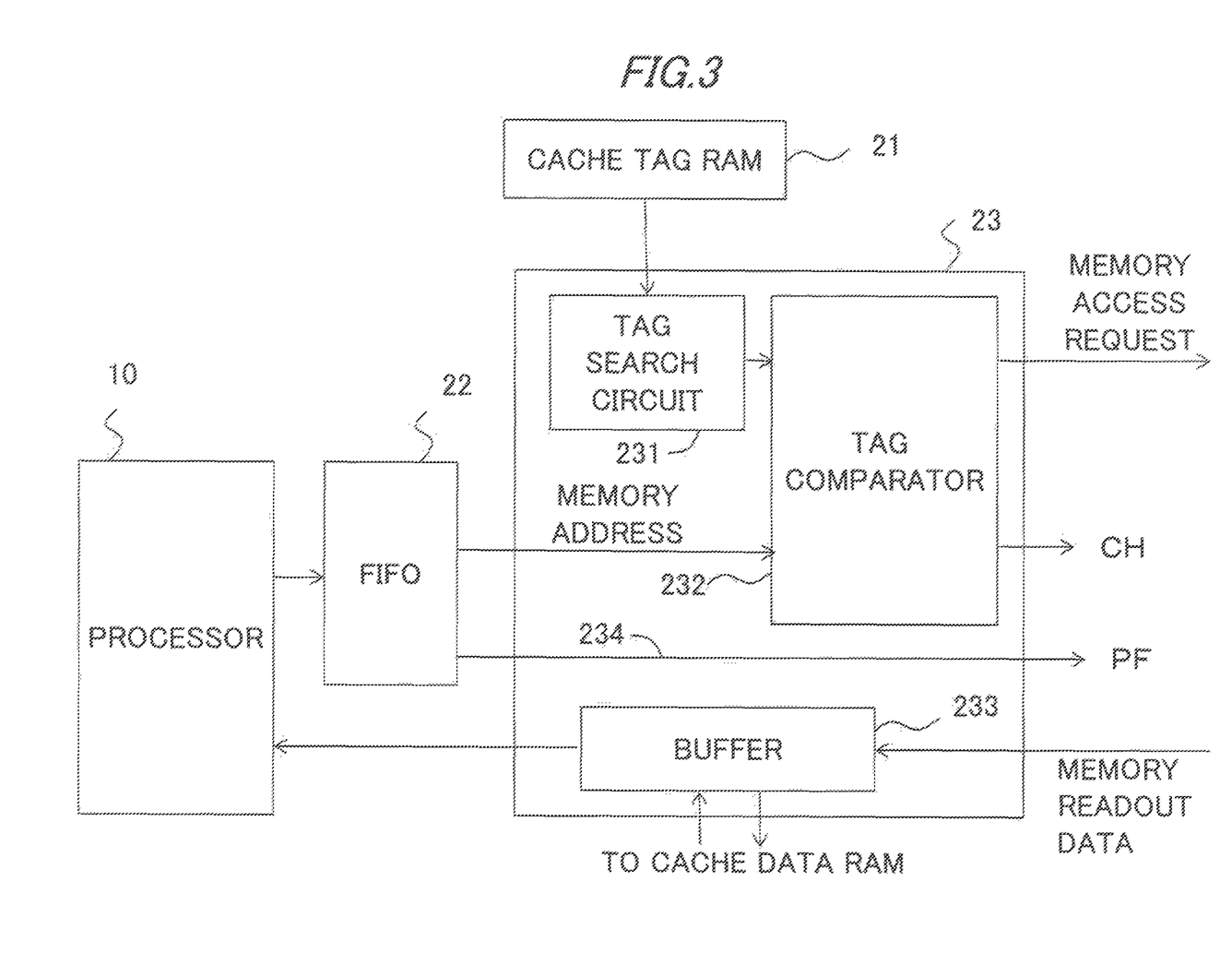
FIG. 3 is a diagram illustrating a configuration of a secondary cache control pipeline 23.

FIG. 3 illustrates a configuration of the secondary cache control pipeline 23. FIG. 3 further illustrates the processor 10, the FIFO 22, and the cache tag RAM 21. As in FIG. 3, the secondary cache control pipeline 23 includes a tag search circuit 231, a tag comparator 232, and a buffer 233.

When the secondary cache memory unit 20 adopts, e.g., a set associative method, control given below is executed. It does not, however, mean in the embodiment 1 that the secondary cache memory unit 20 is limited to the set associative method; but a full associative method and a direct mapping method are also available.

The tag search circuit 231 specifies a set of the cache tag RAM 21 by part (low-order address) of the address of the memory access request, and searches for a tag (high-order address) within the set. The tag search circuit 231 generates an address acquired from the cache tag RAM 21 by combining the searched high-order address and the low-order address, and outputs the generated address to the tag comparator 232. The tag comparator 232 determines whether the address generated by the tag search circuit 231 is coincident with an address of the memory access request given from the FIFO 22. The tag comparator 232 determines, based on this determination, whether the cache-hit occurs. When the cache-hit occurs, the tag comparator 232 instructs a cache data readout circuit to fetch the cache data into the buffer 233. The data fetched into the buffer 233 is returned to the processor 10. Whereas when a cache-miss occurs, the tag comparator 232 instructs the readout circuit of the main storage device 90 to issue a data read request to the main storage device 90. The data read from the main storage device 90 is retained on an unillustrated cache data RAM, and is sent to the processor 10.

The secondary cache control pipeline 23 transmits, to the prefetch inhibition unit 24, a prefetch flag signal PF contained in the memory access request and a cache-hit signal CH indicating whether the cache-hit occurs. Note that the prefetch flag signal PF is copied directly from the access request of the FIFO 22 and transmitted to the prefetch inhibition unit 24 in FIG. 3.

As described above, the secondary cache control pipeline 23 executes a pipeline process of reading the tag of the cache tag RAM 21 and comparing the readout tag with the address of the memory access request. The secondary cache control pipeline 23 outputs the cache-hit signal CH as a comparative result together with the prefetch flag signal PF contained in the memory access request to the prefetch inhibition unit 24.

Figure 4:
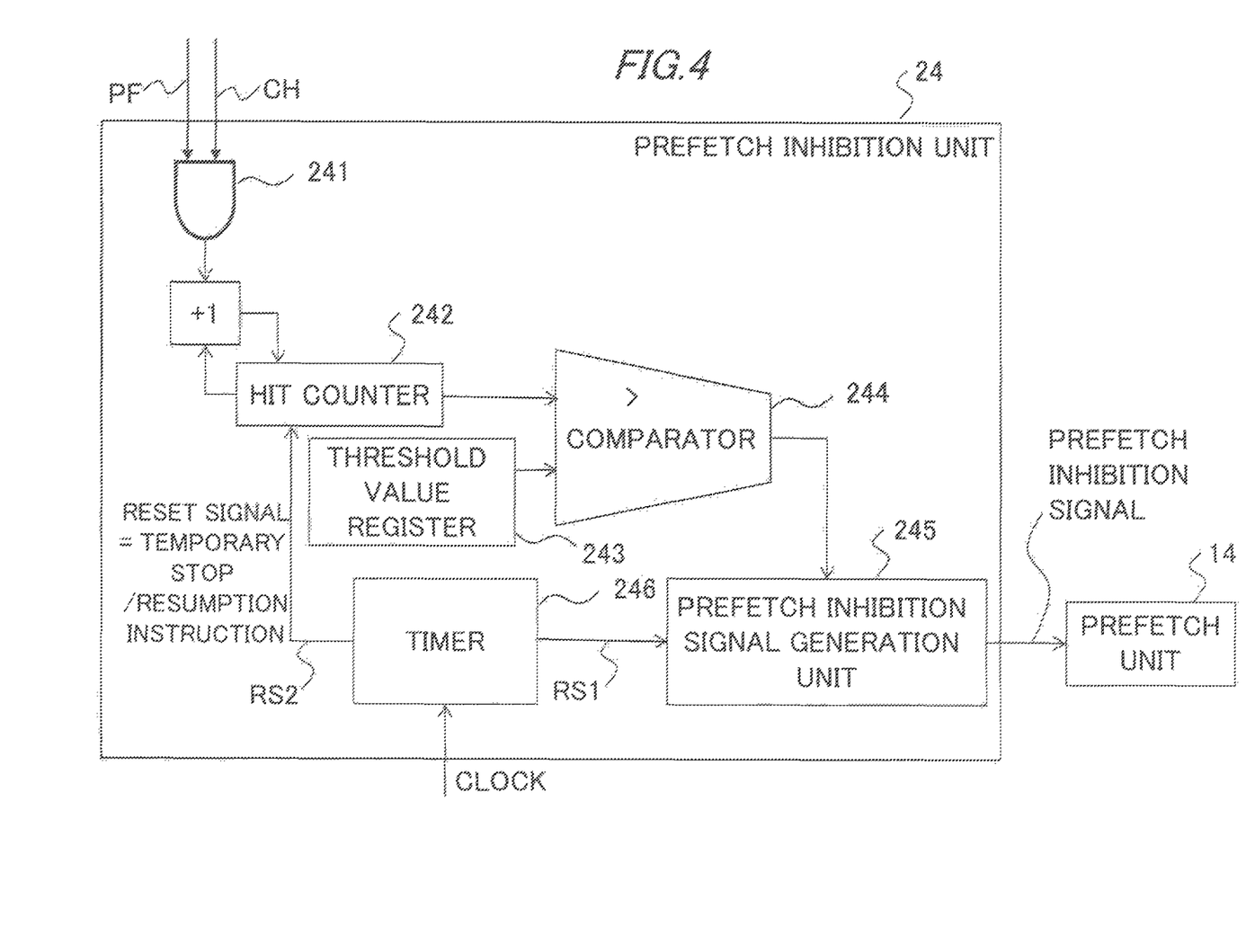
FIG. 4 is a diagram illustrating a configuration of a prefetch inhibition unit.

FIG. 4 illustrates a configuration of the prefetch inhibition unit 24. The prefetch inhibition unit 24 includes an AND gate 241, a hit counter 242, a threshold value register 243, a comparator 244, a prefetch inhibition signal generation unit 245, and a timer 246. As in FIG. 4, a signal line of an inhibition indication signal is connected to the prefetch unit 14 from the prefetch inhibition unit 24.

The AND gate 241 receives inputs of the prefetch flag signal PF and the cache-hit signal CH. An input logical product (AND) signal from the AND gate 241 increments the hit counter 242. To be specific, when both of the cache-hit signal CH and the prefetch flag signal PF are ON (true), the hit counter 242 is counted up. Accordingly, the hit counter 242 is said to be one example of a "counter unit configured to count a hit count of prefetch request target data" in the secondary cache memory unit 20 when the secondary cache control pipeline 23 executes a response process to the prefetch request. Specifically in the embodiment 1, the hit counter 242 counts the hit count in the secondary cache memory by way of one example of the counter unit. Herein, the term "hit" is exemplified as an indication that the memory access request target data is retained in the cache memory instanced by the secondary cache memory. Supposing that a host device is the processor 10 including the instruction control unit 11, the LD/ST unit 12, the primary cache memory 13 and the prefetch unit 14, the secondary cache memory unit 20 can be said to be a subordinate cache memory.

A predetermined threshold value is stored in the threshold value register 243. The comparator 244 compares a value of the hit counter 242 with a value of the threshold value register 243. When the value of the hit counter 242 is coincident with the value designated by the threshold value register 243, the comparator 244 instructs the prefetch inhibition signal generation unit 245 to output a prefetch inhibition signal, and starts up the timer 246. Note that the threshold value register 243 outputs a threshold value read from a threshold value table that actually stores a plurality of threshold values in the embodiment 1. The threshold value register 243 may, however, directly retain the threshold values without using the threshold value table.

Thereafter, till the timer 246 measures a predetermined period of time, the prefetch inhibition signal generation unit 245 asserts, e.g., sets ON the prefetch inhibition signal. Accordingly, the prefetch inhibition signal is asserted, during which the prefetch request given from the prefetch unit 14 is inhibited. The timer 246 subtracts a count value from a specified value (corresponding to specified time) in accordance with a clock signal (CLOCK) and, when the count value reaches "0", resets the prefetch inhibition signal generation unit 245 and the hit counter 242.

The timer 246 has, e.g., a signal line RS1 for inputting the rest signal to the prefetch inhibition signal generation unit 245. The timer 246 further has, e.g., a signal line RS2 for inputting the reset signal to the hit counter 242. The reset signals of the signal line RS1 and the signal line RS2 may be connected to a same output interface (signal port and other equivalent interfaces) of the timer 246. The signal line RS1 and the signal line RS2 can be said to be one example of a "reset unit" to cancel inhibition by an inhibition circuit (the prefetch inhibition unit 24, the prefetch inhibition signal generation unit 245) when the timer 246 measures an elapse of the predetermined period of time and to reset a counter unit (the hit counter 242). The prefetch inhibition signal generation unit 245 negates, e.g., sets OFF the prefetch inhibition signal by the reset signal from the timer 246. The hit counter 242 starts counting from the initial value "0" upon receiving the reset signal from the timer 246. The timer 246 is one example of a "timer configured to be started up when inhibiting transmission of a prefetch request".

As described above, the prefetch inhibition unit 24 has two states. One state is a prefetch operation state. The prefetch operation state is a state of performing the prefetch operation as a normal operation. During this prefetch operation, the prefetch inhibition signal is kept OFF. The hit counter 242 executes the counter operation till reaching a value of the threshold value register 243 from the initial value "0".

On the other hand, the other state is a prefetch inhibition state. The prefetch inhibition state is a state of stopping the prefetch. In the prefetch inhibition state, the prefetch inhibition signal is asserted, and the timer 246 executes the subtracting operation in accordance with the clock.

After the processor 10 has started operating, an initial state is the prefetch operation state. The prefetch inhibition request is OFF (false), and the prefetch is kept effective as a normal function. When the prefetch request is put into the secondary cache control pipeline 23, the secondary cache control pipeline 23 and the prefetch inhibition unit 24 operate in procedures described below.

(1) The secondary cache control pipeline 23 refers to the cache tag RAM 21, and thus determines whether the cache-hit occurs. In the case of the cache-hit, the secondary cache control pipeline 23 transmits hit data to the primary cache memory 13, and further transmits the cache-hit signal CH to the prefetch inhibition unit 24. In the case of the cache-miss, the secondary cache control pipeline 23 generates the memory access request to the main storage device 90. The secondary cache control pipeline 23 stores the data read from the main storage device 90 into the cache data RAM, and transmits the same data to the primary cache memory 13. The secondary cache control pipeline 23 further transmits the prefetch flag signal PF to the prefetch inhibition unit 24.

(2) The prefetch inhibition unit 24 increments the hit counter 242 when both of the prefetch flag signal PF and the cache-hit signal CH are ON.

(3) The prefetch inhibition unit 24 compares a value(s) of the hit counter 242 with a designated value of the threshold value register 243. Herein, the designated value connote a value(s) (FIG. 7) stored in a threshold value table, which is selected by the value retained in the threshold value register 243. The designated value may also, however, be the value itself that is retained in the threshold value register 243. When the value of the hit counter 242 reaches the designated value of the threshold value register 243, the prefetch inhibition unit 24 asserts the inhibition signal, and starts the timer 246. Hereafter, the state of the prefetch inhibition unit 24 becomes the prefetch inhibition state.

(4) When the timer 246 finishes measuring the time, the prefetch inhibition unit 24 negates the inhibition signal, and becomes the prefetch operation state. The hit counter 242 is reset. Thus, the reset signal from the timer 246 may be called a temporary stop/resumption instruction.

Figure 5:
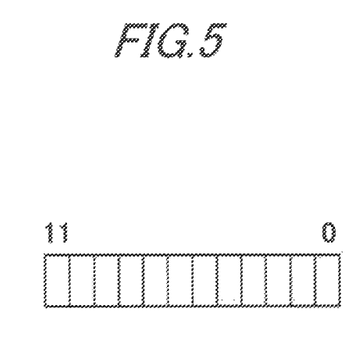
FIG. 5 is a diagram illustrating of a structure of a hit counter.
Figure 6:
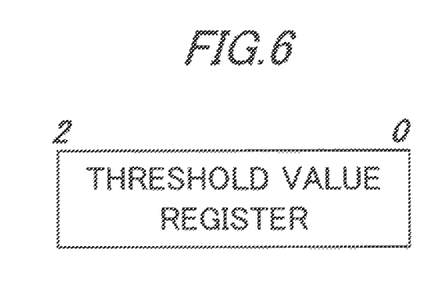
FIG. 6 is a diagram illustrating a structure of a threshold value register.
Figure 7:
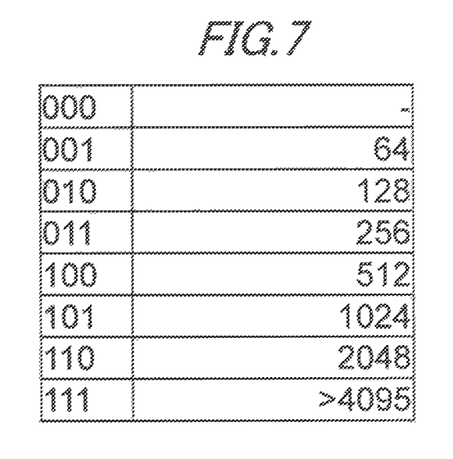
FIG. 7 is a diagram illustrating a structure of a threshold value table.

FIG. 5 illustrates a configuration of the hit counter 242. The hit counter has, e.g., a 12-bit width and is thereby enabled to count "4095" at the maximum. FIG. 6 illustrates a structure of the threshold value register 243. According to the embodiment 1, the threshold value register 243 refers to the threshold value table indirectly. A plurality of values is stored in the threshold table. The threshold value register 243 is used for controlling about which value in the threshold value table is compared with the value of the hit counter 242. To be specific, in the embodiment 1, an actual threshold value referred to by the comparator 244 is stored in an entry of the threshold table, which is specified by a 3-bit value set in the threshold value register 243. The threshold value register 243 sends a selection signal to, e.g., an unillustrated selector, and outputs the threshold value from the entry selected in the threshold value table to the comparator 244. A prefetch frequency varies depending on an application program run by the information processing apparatus 100, and hence, in the prefetch inhibition unit 24 of the embodiment 1, the threshold value can be selected by a computer program when starting up a system. When the hit counter 242 reaches the threshold value given in the entry of the threshold table that is designated by the threshold value register 243, the prefetch inhibition unit 24 transitions to the prefetch inhibition state, and starts inhibiting the prefetch. The prefetch inhibition unit 24 starts inhibiting the prefetch and simultaneously starts the timer 246.

The timer 246 is, e.g., the same 12-bit counter as the hit counter 242 in FIG. 4. However, the timer 246 receives the clock and implements the subtraction (decrement) from the initial value. The timer 246, after transitioning to the prefetch inhibition state, performs the following operation. The timer 246 counts down at every cycle in accordance with the clock. The timer 246, when the value becomes "0", resets the prefetch inhibition signal generation unit 245 and the hit counter 242.

Figure 8:
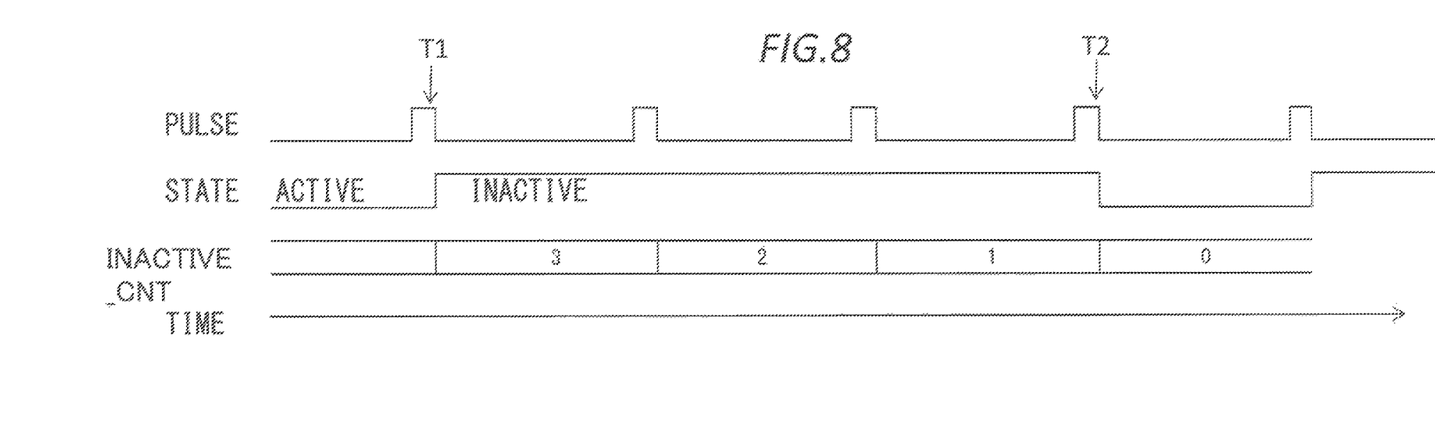
FIG. 8 is a timing chart illustrating state transitions of the prefetch inhibition unit.

FIG. 8 is a timing chart illustrating a state transition of the prefetch inhibition unit 24. Simultaneously when the state transitions from ACTIVE to INACTIVE, INACTIVE_CNT is set to, e.g., a value "3" (arrow T1). Each time a clock pulse is generated, this counter is decremented, and the state transitions to the ACTIVE state just when becoming "0" (arrow T2). The prefetch inhibition unit 24 or the prefetch inhibition signal generation unit 245 can be said to be one example of an "inhibition unit configured to inhibit a prefetch unit (the prefetch unit 14) from sending the prefetch request when a counted hit count reaches a threshold value".

Figure 9:
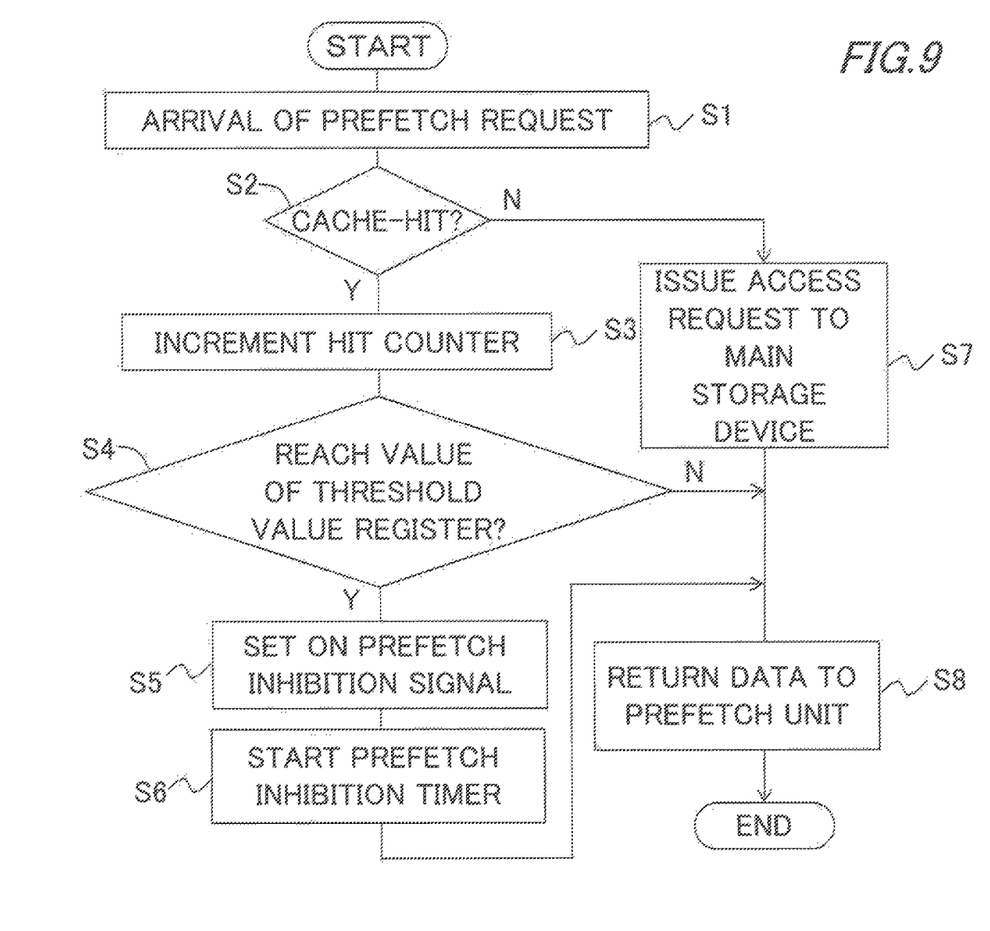
FIG. 9 is a flowchart illustrating processes of a secondary cache control pipeline and the prefetch inhibition unit.

FIG. 9 illustrates processes of the secondary cache control pipeline 23 and the prefetch inhibition unit 24. These processes in FIG. 9 are, though illustrated in a flowchart, executed by a hardware circuit. To begin with, the prefetch request arrives at the secondary cache control pipeline 23 (S1). More specifically, the secondary cache control pipeline 23 acquires the prefetch request from the FIFO 22. The process in S1 is one example of "accepting by a subordinate cache memory, the prefetch request".

Next, the secondary cache control pipeline 23 recognizes the access based on the prefetch, and determines whether the cache-hit occurs (S2). In the case of the cache-hit, the prefetch flag signal PF is inputted together with the cache-hit signal CH to the prefetch inhibition unit 24. The prefetch inhibition unit 24 increments the hit counter 242 by the logical product (AND) signal of the cache-hit signal CH and the prefetch flag signal PF. In other words, the prefetch inhibition unit 24 counts a cache-hit count, namely how many times target data of the prefetch request is acquired in the cache (S3). The process in S3 is one example of "counting a hit count of how many times it is detected that prefetch request target data is retained in the subordinate cache memory" when executing a response process to respond to the accepted prefetch request.

Subsequently, the prefetch inhibition unit 24 determines whether a value of the hit counter 242 reaches the set threshold value (S4). Note that the determination in S4 may include determining whether the value of the hit counter 242 exceeds the set threshold value. When the value of the hit counter 242 reaches the threshold value (YES in S4), the prefetch inhibition unit 24 instructs the prefetch unit 14 to inhibit the prefetch request from being issued (S5). The process in S5 is one example of "inhibiting the prefetch request from being sent when the counted hit count reaches the threshold value". The prefetch inhibition unit 24 starts the timer 246 (S6). As a result, the inhibition of the issuance of the prefetch request is canceled after a fixed period of time, and the hit counter 242 resumes the count from "0". Iteration of this process enables a reduction of the futile prefetches or the prefetches with the small effect in prefetching the data.

Note that the secondary cache control pipeline 23 returns the prefetched data to the prefetch unit 14 (S8). When determining in S2 that the cache-miss occurs, the secondary cache control pipeline 23 issues the memory access request to the main storage device 90 (S7). The secondary cache control pipeline 23 stores the data read from the main storage device 90 in the secondary cache memory unit 20 (cache data RAM), and returns the data read into the prefetch unit 14. With the operation described above, it is possible to inhibit the futile prefetches when the cache-hit occurs many times.

Effect of Embodiment 1

The information processing apparatus 100 according to the embodiment 1 inhibits the futile prefetches or the prefetches with the small effect that causes the cache-hit to occur in the secondary cache memory when prefetch request target data is concentratedly hit in the cache memory. Consequently, there is an effect in reducing the electric power consumed by the cache memory. Simultaneously, it is feasible to process the memory access requests input to the secondary cache control pipeline 23 via the FIFO 22, whereby performance of the processor 10, which encompasses memory access performance, is improved.

The effects of the embodiment 1 remarkably appear in the processors equipped with the multilayered cache memories of the recent years. Normally, an access destination address of the hardwarewise prefetch is generated in the vicinity of the instruction control unit 11, e.g., by the prefetch unit 14 provided in the side-by-side relationship with the LD/ST unit 12 as in FIG. 1. The prefetch unit 14 is therefore disabled from directly referring to the cache tag of the secondary cache. It therefore follows that the prefetch unit 14 generates a multiplicity of addresses causing the cache-hit in the secondary cache. The information processing apparatus 100 according to the embodiment 1 can inhibit the unnecessary prefetch to the address that is hit in the cache memory and the prefetch with the small effect.

When the prefetch target address is once hit in the cache memory, the cache-it tends to continue. Accordingly, when counting the hit count of how many times the prefetch target address is hit in the cache memory and when the count value reaches the threshold value, the prefetch is inhibited, thereby enabling the reduction of the futile prefetch or the prefetch with the small effect.

In particular, read time expended for the primary cache memory 13 to acquire the data from the secondary cache memory unit 20 is shorter than the read time in such a case that the secondary cache memory unit 20 acquires the data from the main storage device 90. Hence, when the prefetch request target data is hit in the secondary cache memory unit 20, the prefetch effect is said to be small. Accordingly, in the case of a 2-layered cache, the prefetch inhibition unit 24 has a larger effect in inhibiting the prefetch by monitoring the cache-hit of the secondary cache memory unit 20 than by monitoring the cache-hit of the primary cache memory 13.

On the other hand, the timer 246 measures the time after inhibiting the prefetch and cancels the inhibition of the prefetch upon an elapse of the predetermined period of time, thereby enabling a balance to be taken between the case of inhibiting the original prefetch and the case of executing the prefetch. In other words, the prefetch inhibition unit 24 can execute the transition to the prefetch operation state from the prefetch inhibition state.

Embodiment 2

Figure 10:
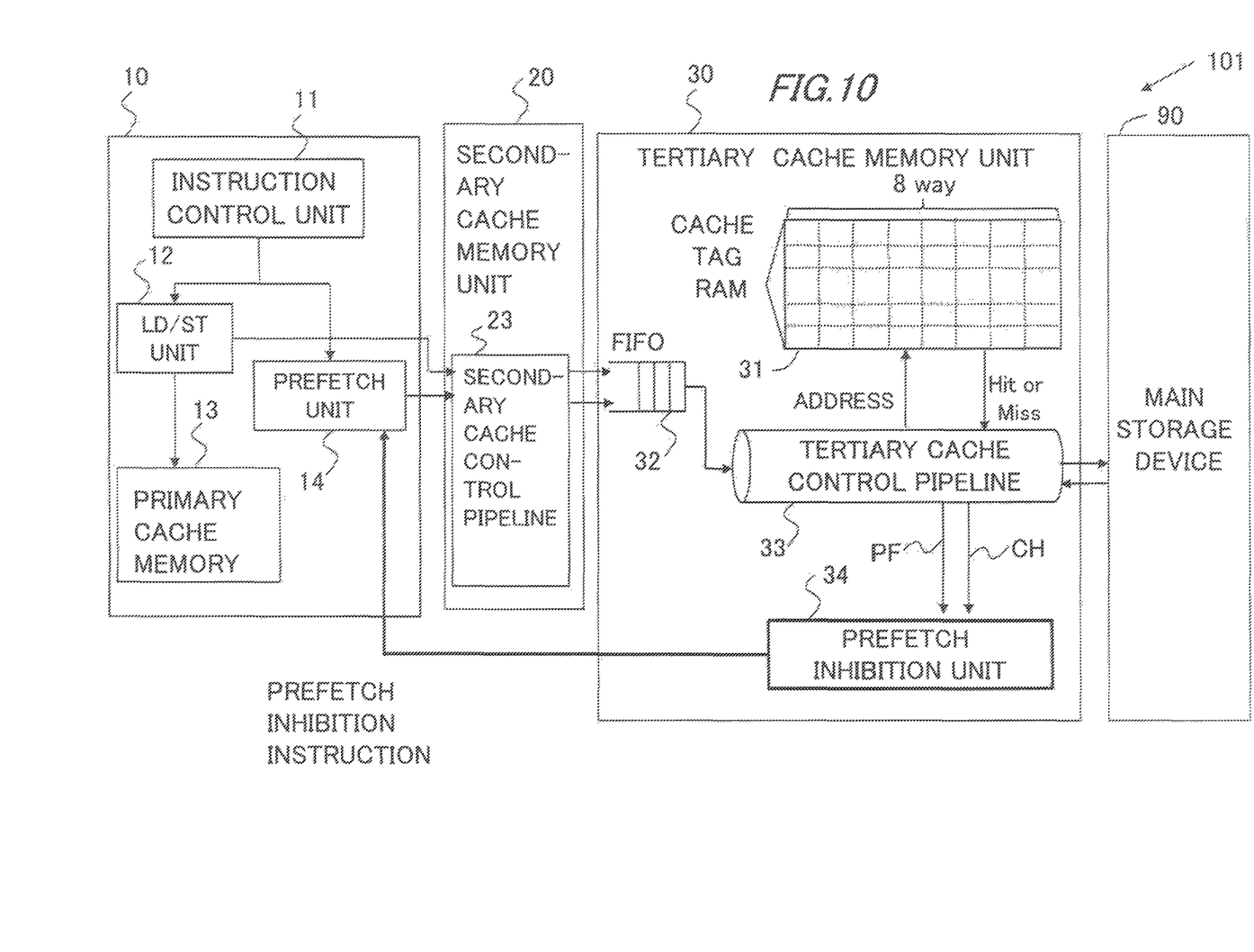
FIG. 10 is a diagram illustrating a configuration of an information processing apparatus according to an embodiment 2.

The information processing apparatus 101 according to an embodiment 2 will be described with reference to FIG. 10. The information processing apparatus 101 according to the embodiment 2 includes a tertiary cache memory unit 30 in addition to the secondary cache memory unit 20. The components other than the tertiary cache memory unit 30 of the information processing apparatus 101 are the same as those of the information processing apparatus 100 according to the embodiment 1. This being the case, the same components of the information processing apparatus 101 in the embodiment 2 as the components of the information processing apparatus 100 in the embodiment 1 are marked with the same numerals and symbols, and hence their repetitive explanations are omitted. In FIG. 10, however, the configuration of the secondary cache memory unit 20 is simplified in illustration. To be specific, the components, excluding the secondary cache control pipeline 23, of the secondary cache memory unit 20 are omitted in FIG. 10.

As in FIG. 10, the tertiary cache memory unit 30 includes a cache TAG RAM 31, a FIFO 32, a tertiary cache control pipeline 33, and a prefetch inhibition unit 34. Configurations and operations of the cache TAG RAM 31, the FIFO 32, the tertiary cache control pipeline 33 and the prefetch inhibition unit 34 are the same as those of the cache TAG RAM 21, the FIFO 22, the secondary cache control pipeline 23 and the prefetch inhibition unit 24 in FIG. 1. The processor 10, the secondary cache memory unit 20 defined as the subordinate cache memory, and the tertiary cache control pipeline 33 can be also said to be one example of an "arithmetic processing apparatus". The embodiment 2 also exemplifies a configuration and an operation of the arithmetic processing apparatus, and a control method of the arithmetic processing apparatus.

The FIFO 32 accepts the memory access request from the secondary cache control pipeline 23 of the secondary cache memory unit 20 via the input port. The memory access request is issued from the prefetch unit 14, in which case, similarly to FIG. 2, the prefetch flag is allocated. The tertiary cache control pipeline 33 determines whether the cache-hit occurs in the cache TAG RAM, then sets ON the cache-hit signal CH and outputs this signal CH to the prefetch inhibition unit 34 when the cache-hit occurs. Note that whereas when the cache-miss occurs in the cache TAG RAM, the tertiary cache control pipeline 33 reads the data by accessing the main storage device 90. The tertiary cache control pipeline 33 outputs the prefetch flag signal PF to the prefetch inhibition unit 34.

A configuration of the prefetch inhibition unit 34 is the same as in FIG. 4. The prefetch inhibition unit 34 counts a count of how many times both of the prefetch flag signal PF and the cache-hit signal CH are set ON. When a count value reaches the threshold value, the prefetch inhibition unit 34 asserts the prefetch inhibition signal, and thus inhibits the prefetch made by the prefetch unit 14 for a predetermined period.

As described above, the information processing apparatus 101 according to the embodiment 2 includes the primary cache memory 13, the secondary cache memory unit 20, and the tertiary cache memory unit 30. When a count of how many times the access destination address at the time of making the prefetch request is hit in the tertiary cache memory unit 30 reaches the threshold value, the prefetch is inhibited. In the case of executing the prefetch, the data is transferred and received in one or more in-between portions, i.e., between the primary cache memory 13 and the secondary cache memory unit 20, between the secondary cache memory unit 20 and the tertiary cache memory unit 30, and between the tertiary cache memory unit 30 and the main storage device 90. Among these, the data transfer/reception between the tertiary cache memory unit 30 and the main storage device 90 requires a longest period of time.

While on the other hand, the data transfer/reception between the primary cache memory 13 and the secondary cache memory unit 20 and between the secondary cache memory unit 20 and the tertiary cache memory unit 30 can be performed faster than accessing the main storage device 90. Accordingly, when the data is not transferred and received between the tertiary cache memory unit 30 and the main storage device 90, a benefit and a merit brought by the prefetch are less than performing the data transfer/reception therebetween. By contrast, when executing the prefetch, the memory access instruction process other than the prefetch has no progress in the FIFO 22 and the secondary cache control pipeline 23 in FIG. 1, and the FIFO 32 and the tertiary cache control pipeline 33 in FIG. 10, resulting in a decrease in efficiency of processor 10.

The information processing apparatus 101 according to the embodiment 2 predicts that there continues the state of the cache-hit in the tertiary cache memory unit 30 that is less of the benefit and the merit brought by the prefetch, and restrains the prefetch for the predetermined period. Hence, the information processing apparatus 101 according to the embodiment 2 can restrain the prefetch request by being limited to a low case of the prefetch effect. This results in enabling the efficient processing of the memory access request by the components including the FIFO 22, the secondary cache control pipeline 23, the FIFO 32 and the tertiary cache control pipeline 33.

Note that the embodiment 2 has described the information processing apparatus 101 including the tertiary cache memory unit 30. It does not, however, mean that the information processing apparatus 101 is limited to the configuration of the embodiment 2. For example, when "N" is set to an integer equal to or larger than "4", the same configuration as that of the embodiment 2 can be also applied to an information processing apparatus including the primary cache memory 13, and the secondary cache memory unit 20 through an N-nary cache memory unit. To be specific, the N-nary cache memory unit is provided with the same circuit as the prefetch inhibition unit 34, and it may be sufficient that the prefetch is inhibited when a hit count in the N-nary cache memory unit reaches the threshold value at the time of executing the prefetch.

As described above, the secondary cache memory unit 20 and the tertiary cache memory unit 30 are exemplified as the subordinate cache memories under the host device, i.e., the processor 10 and other equivalent processors. Accordingly, the primary cache memory 13, the secondary cache memory unit 20, and the tertiary cache memory unit 30 are said to have an N-layered structure with respect to the integer N equal to or larger than "3". In this case, the primary cache memory 13 is said to transfer and receive the data between the instruction control unit 11 and the LD/ST unit 12 etc. as one example of an "arithmetic control unit", and the secondary cache memory unit 20. The N-nary cache memory unit is said to transfer and receive the data between an (N−1)nary cache memory unit and the main storage device 90. Each of the secondary cache memory through the (N−1)nary cache memory is said to transfer and receive the data between the host cache memory and the subordinate cache memory.

Though a description is omitted in the embodiment 2, a configuration of the prefetch inhibition unit 34 in FIG. 10 is the same as the configuration of the prefetch inhibition unit 24 depicted in FIG. 4. Therefore, the prefetch inhibition unit 34 includes the hit counter 242, the threshold value register 243, the comparator 244, the prefetch inhibition signal generation unit 245 and the timer 246 illustrated in FIG. 4. The hit counter 242 of the prefetch inhibition unit 34 is one example of a "count unit to count a hit count in an N-nary cache memory". Accordingly, the prefetch inhibition unit 34 is said to inhibit the prefetch circuit (prefetch unit 14) from sending the prefetch request when the count value of the counter (the hit counter 242) exceeds the threshold value.

Other Modified Examples

In the embodiment 1, the prefetch inhibition unit 24 is provided in the secondary cache memory unit 20 adjacent to the main storage device 90. In the embodiment 2, the prefetch inhibition unit 34 is provided in the tertiary cache memory unit 30 adjacent to the main storage device 90. It does not, however, mean that the configurations of the information processing apparatuses 100, 101 are limited to the configurations of the embodiments 1 and 2. For example, in the configuration of the embodiment 2, the prefetch inhibition units 24, 34 may also be provided in each of the secondary cache memory unit 20 and the tertiary cache memory unit 30. When the prefetch inhibition units 24, 34 are provided in each of the secondary cache memory unit 20 and the tertiary cache memory unit 3, it may be sufficient that the prefetch is inhibited by the prefetch inhibition signals of the prefetch inhibition units 24, 34 in such a way that a logical sum signal is generated by an OR gate. In other words, the prefetch unit 14 may inhibit the prefetch when any one of the prefetch inhibition signals of the plurality of prefetch inhibition units 24, 34 is ON.

Similarly, N is set to the integer equal to or larger than "4", the information processing apparatus including the primary cache memory 13 and the secondary cache memory unit 20 through the N-nary cache memory unit may also be provided with the plurality of prefetch inhibition units 24, 34, . . . . Specifically, the prefetch inhibition units 24, 34 may be provided in one or more of the subordinate multilayered (N−1 layered) cache memories under the primary cache memory 13. When any one of the prefetch inhibition signals of the plurality of prefetch inhibition units 24, 34 provided in the subordinate multilayered cache memory units 20, 30, . . . is ON, the prefetch unit 14 may also inhibit the prefetch. In this configuration also, it is feasible to detect such a state that the data of the prefetch target address is continuously cached in a position distanced from the processor 10, i.e., in any one or more of the secondary cache memory unit 20 through the N-nary cache memory unit. The prefetch with the small effect is therefore inhibited.

In the embodiments 1 and 2, the prefetch inhibition unit 24 instructs the prefetch unit 14 to inhibit the issuance of the prefetch request, and starts the timer 246 (e.g., S5, S6 in FIG. 9). More specifically, the timer 246 operates in the prefetch inhibition state, and controls the time of the prefetch inhibition state. Whereas in the prefetch operation state, the timer 246 is not used. It does not, however, mean that the processes of the information processing apparatuses 100, 101 are limited the embodiments 1 and 2. For instance, when the hit counter 242 is not incremented for the predetermined period of time or longer in the prefetch operation state, the timer may reset the hit counter 242. Specifically, the timer measures the time such that an update interval of the hit counter 242 is equal to or longer than the predetermined period of time, in which case it may be deemed that any cache-hit for target data of prefetch requests have not occurred up to a point of the time measurement.

Figure 11:
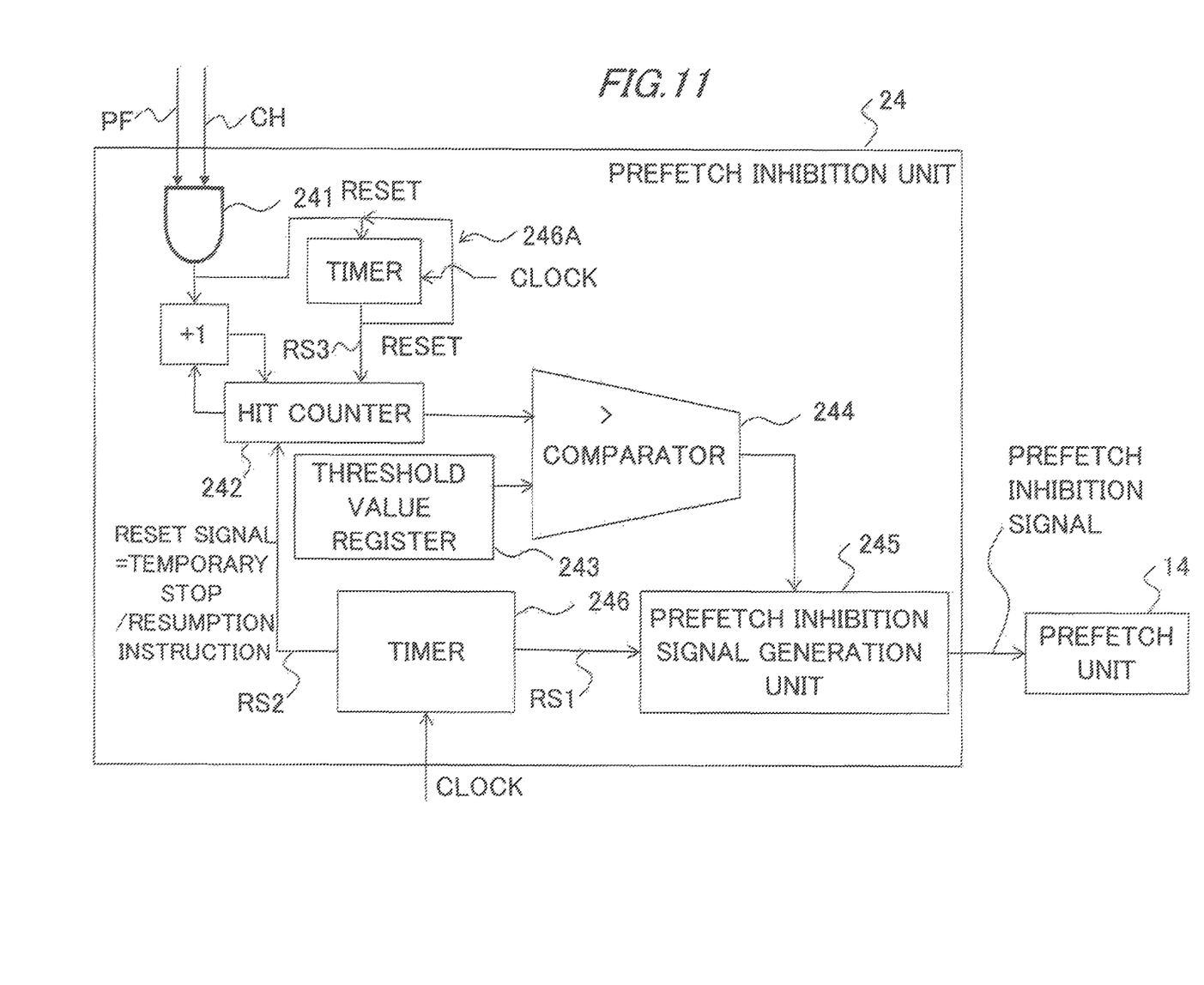
FIG. 11 is a diagram illustrating a configuration of a prefetch inhibition unit according to a modified example.

FIG. 11 illustrates a configuration of a prefetch inhibition unit 24A according to a modified example. In the example of FIG. 11, a timer 246A is further provided as compared with FIG. 4. The timer 246A is reset by the logical product signal of the prefetch flag signal PF and the cache-hit signal CH, and measures the predetermined time. The timer 246A sets the count value to "0" by resetting the hit counter 242. Hence, when an input interval of the logical product signal of the prefetch flag signal PF and the cache-hit signal CH is longer than the predetermined time measured by the timer 246A, the hit counter 242 does not count based on the logical product signal of the prefetch flag signal PF and the cache-hit signal CH.

Such a configuration being taken, even when the cache-hit occurs in response to the prefetch request at an occurrence interval longer than the predetermined time, the prefetch inhibition signal is not transmitted to the prefetch unit 14. This is because even when the cache-hit occurs in response to the prefetch request in a long time to some degree, the cache-hit does not necessarily continue in response to the prefetch request. Accordingly, in the configuration of FIG. 11, when the cache-hit continues within the predetermined time in response to the prefetch request, it follows that the prefetch is inhibited. The timer 246A and a signal RS3 for resetting the hit counter from the timer 246 are one example of a "second reset unit".

Note that the timer 246A may be used in combination with the timer 246. The timer 246A operates in the prefetch operation state, while the timer 246 operates in the prefetch inhibition state, and hence both of these timers can be used in combination. The timer 246 substitutes for the timer 246A, in which case the timer 246 and the signal line RS2 serve as the second reset circuit. In this case, it may be sufficient that the timer 246 is reset from the AND gate 241. Namely, the AND gate 241 may simply reset the timer 246 in the prefetch operation state.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An arithmetic processing apparatus comprising:
    a prefetch unit configured to send a prefetch request to a subordinate cache memory for prefetching data of a main storage device into a primary cache memory;
    a count unit configured to count a hit count of how many times it is detected that prefetch request target data is retained in the subordinate cache memory when executing a response process to respond to the prefetch request sent from the prefetch unit; and
    an inhibition unit configured to inhibit the prefetch unit from sending the prefetch request when the counted hit count reaches a threshold value.

2. The arithmetic processing apparatus according to claim 1, wherein the subordinate cache memory is a secondary cache memory to transfer and receive data between the primary cache memory and the main storage device, and
    the count unit counts the hit count in the secondary cache memory.

3. The arithmetic processing apparatus according to claim 1, wherein the primary cache memory and the subordinate cache memory have an N-layered structure with respect to an integer N equal to or larger than "3",
    the primary cache memory transfers and receives the data between an arithmetic control unit and the secondary cache memory,
    an N-nary cache memory transfers and receives the data between an (N−1)nary cache memory and the main storage device,
    each of the secondary cache memory through the (N−1) nary cache memory transfers and receives the data between a host cache memory and a subordinate cache memory, and
    the count unit counts the hit count in the N-nary cache memory.

4. The arithmetic processing apparatus according to claim 1, further comprising:
    a timer configured to be started up when the inhibition unit inhibits the prefetch request from being sent; and
    a reset unit configured to cancel inhibition by the inhibition unit when the timer measures an elapse of a predetermined period of time and to reset the count unit.

5. The arithmetic processing apparatus according to claim 1, further comprising a second reset unit configured to reset the count unit when the count unit does not update a count value within a predetermined period of time.

6. A control method of an arithmetic processing apparatus, the control method comprising:
    accepting by a subordinate cache memory, a prefetch request for prefetching data of a main storage device into a primary cache memory;
    counting a hit count of how many times it is detected that prefetch request target data is retained in a subordinate cache memory when executing a response process to respond to the accepted prefetch request; and
    inhibiting the prefetch request from being sent when the counted hit count reaches a threshold value.

* * * * *